US007443978B2

(12) United States Patent
Isaka et al.

(10) Patent No.: US 7,443,978 B2
(45) Date of Patent: Oct. 28, 2008

(54) METHOD AND APPARATUS FOR AUDIO CODING WITH NOISE SUPPRESSION

(75) Inventors: Takehiko Isaka, Ome (JP); Kimio Miseki, Ome (JP); Takashi Obara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1176 days.

(21) Appl. No.: 10/654,400

(22) Filed: Sep. 4, 2003

(65) Prior Publication Data

US 2005/0055116 A1 Mar. 10, 2005

(51) Int. Cl.
*H04M 9/08* (2006.01)

(52) U.S. Cl. ................................................ 379/406.03

(58) Field of Classification Search ............. 379/406.03
See application file for complete search history.

(56) References Cited

U.S. PATENT DOCUMENTS

| | | | | |
|---|---|---|---|---|
| 6,144,937 | A | 11/2000 | Ali | |
| 6,408,269 | B1 | 6/2002 | Wu et al. | |
| 7,058,574 | B2 * | 6/2006 | Taniguchi et al. | 704/233 |
| 2002/0072899 | A1 | 6/2002 | Paksoy et al. | |
| 2002/0097807 | A1 | 7/2002 | Gerrits | |
| 2006/0098808 | A1 * | 5/2006 | Marchok et al. | 379/406.02 |

FOREIGN PATENT DOCUMENTS

| | | | |
|---|---|---|---|
| CN | 1194068 | A | 9/1998 |
| CN | 1418361 | A | 5/2003 |
| EP | 1 154 408 | A2 | 11/2001 |
| JP | 08 065211 | A | 3/1996 |
| JP | 8-065211 | A2 | 3/1996 |
| JP | 2001-318694 | A2 | 11/2001 |
| WO | WO 97/02664 | | 1/1997 |
| WO | WO 02/058052 | | 7/2002 |

OTHER PUBLICATIONS

Basbug et al "Integrated Noise Reduction and Echo Cancellation for IS-136 Systems", 2000, IEEE Int. Conf. on Acoustics, Speech and Signal Processing, ICASSP '00, vol. 3, Jun. 5-9, 2000; pp. 1863-1866.*

P. Dreiseitel et al., "Acoustic Echo and Noise Control—A Long Lasting Challange", Proc. EUSIPCO- 98, pp. 1-8, (Sep. 1998).

T. Taniguchi et al., "Signal Processing Apparatus and Moble Radio Communication Terminal" U.S. Appl. No. 09/852,235, filed May 10, 2001.

Notification of the First Office Action issued by the Patent Office of the People's Republic of China dated Feb. 10, 2006, and English language translation thereof.

* cited by examiner

*Primary Examiner*—Ramnandan Singh
(74) *Attorney, Agent, or Firm*—Finnegan, Henderson, Farabow, Garrett & Dunner, L.L.P.

(57) ABSTRACT

There is disclosed an audio coding apparatus which has a wideband encoder and noise canceller. The encoder includes a high-frequency audio coder and low-frequency audio coder. The low-frequency audio coder includes a low-frequency noise canceller. When the high-frequency audio coder is disabled, the noise canceller is disabled, and allows a digital audio signal to pass through it and outputs that signal to the encoder. When the high-frequency audio coder is enabled, the low-frequency noise canceller is disabled, and allows a digital audio signal to pass through it.

8 Claims, 7 Drawing Sheets

METHOD AND APPARATUS FOR AUDIO CODING WITH NOISE SUPPRESSION

BACKGROUND OF THE INVENTION

1. Field of the Invention

The present invention generally relates to an audio signal processing apparatus which is applied to digital audio communications systems in the mobile communications field of, e.g., portable phones and the like and, more particularly, to a noise suppression function or echo suppression function in audio coding.

2. Description of the Related Art

In general, in the mobile communications field of, e.g., portable phones and the like, a digital audio communications system is applied. The digital audio communications system adopts audio coding (compression coding) to transmit compressed audio data.

In the mobile communications field, a low-bit rate coding method called CELP (Code Excited Linear Prediction) is known as a typical audio coding method. Upon audio coding using such method, not only an audio signal but also an audio signal including noise components called high-frequency ambient noise is often encoded.

As is known, when an audio signal containing noise and echo components is encoded, encoded audio data with poor quality is generated. For this reason, an audio coding circuit adopts a noise suppression circuit called a noise canceller so as to input only an audio signal from which noise components are suppressed. Also, an echo suppression circuit such as an echo canceller, voice switch, or the like is adopted to input an audio signal from which echo components are suppressed.

The noise canceller determines a state wherein no audio signal is input, i.e., only an ambient noise signal is input. The noise canceller analyzes the feature of the ambient noise signal in that state. Then, the noise canceller suppresses noise components using the feature during a period in which an audio signal and noise components mix.

The echo canceller determines a state wherein an audio signal reaches the receiving side but no audio signal is output from the sending side, i.e., a single-talk state of the receiving side. The echo canceller learns the returned acoustic characteristics from the receiving side to the sending side in that state. Then, the noise canceller suppresses echo components that mix in a signal on the sending side using the learned acoustic characteristics. The voice switch compares the signal powers of the receiving and sending sides, and suppresses echo components by inputting a loss to the lower power side.

An audio coding scheme used in current portable phones is limited to the frequency band where an audio signal is mainly present. In recent years, a wideband coding scheme that implements audio coding in a frequency band wider than the audio signal frequency band is undergoing standardization. Such wideband coding scheme adopts CELP, and requires the noise canceller and echo canceller or voice switch.

In an audio signal processor which uses a noise canceller and adopts a wideband coding scheme, a digital audio signal routed via the noise canceller is divided into high-frequency audio signal components which have less power as an audio signal and are not important in terms of information, and other low-frequency audio signal components. High-frequency audio signal components are not necessary in a given coding mode, and a method of removing such components from encoded audio data is known. As the coding mode, for example, AMR-WB (Adaptive Multi-Rate Wideband) codec specified by the 3GPP (3rd Generation Partnership Project) standard is available.

In fact, in the coding mode that outputs encoded audio data of only low-frequency audio signal components (e.g., when the transmission rate is other than 23.85 kbps in AMR-WB), the noise canceller need not execute a noise suppression process for digital audio signal components of a full frequency band output from an A/D converter 11, and need only execute a noise suppression process for low-frequency audio signal components.

In general, the noise canceller comprises a digital signal processor (DSP). Therefore, when the noise canceller executes digital audio signal components of the full frequency band, an excessive data processing volume and memory size are required for the DSP upon implementing the noise canceller function.

The same applies to the echo canceller, and the audio signal processing efficiency are desirably improved by reducing the data processing volume and memory size required to implement an echo suppression function.

Note that a method of reducing the calculation volume and necessary memory size has been proposed, in which echo cancellation of only low-frequency audio signal components without that of high-frequency audio signal components is executed (for example, see Jpn. Pat. Appln. KOKAI Publication No. 8-65211). However, with this method, high-frequency echo components remain unremoved.

BRIEF SUMMARY OF THE INVENTION

In accordance with one embodiment of the present invention, it is an object of the present invention to provide an audio coding apparatus which can improve the audio coding processing efficiency by reducing the data processing volume and memory size required for a noise canceller in audio coding.

An apparatus for audio coding comprises a high-frequency audio coder which executes encoding for high-frequency audio components of a digital audio signal, a downsampling unit which lowers a sampling frequency of the same digital audio signal as the high-frequency audio coder processes, a noise suppressor which suppresses noise components contained in the signal processed by the downsampling unit, and a low-frequency audio coder which encodes the signal processed by the noise suppressor.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The fundamental arrangement of the present invention is classified into four patterns, as shown in FIGS. 16A to 16D.

Figure 16A:
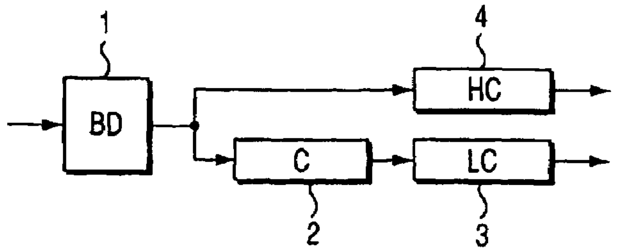
FIGS. 16A to 16D are block diagrams showing the fundamental arrangement of the present invention.

In the first pattern, as shown in FIG. 16A, a band division (BD) unit 1 divides a digital audio signal into frequency bands. A corrector (C) 2 corrects a low-frequency audio signal after band division, and outputs the corrected signal to a low-frequency coder (LC) 3. A high-frequency coder (HC) 4 encodes a high-frequency audio signal after band division.

Figure 16B:
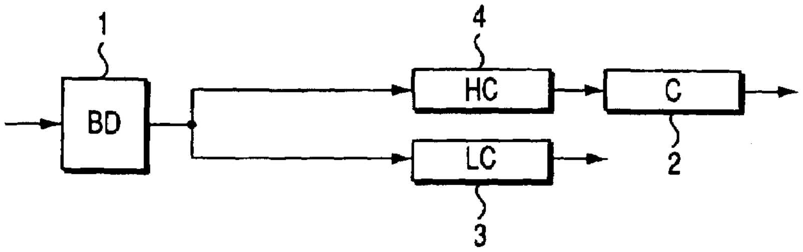

In the second pattern, as shown in FIG. 16B, a band division (BD) unit 1 outputs a low-frequency audio signal after band division to a low-frequency coder 3, and outputs a high-frequency audio signal to a high-frequency coder 4. A corrector 2 corrects high-frequency audio codes encoded by the high-frequency coder 4.

Figure 16C:
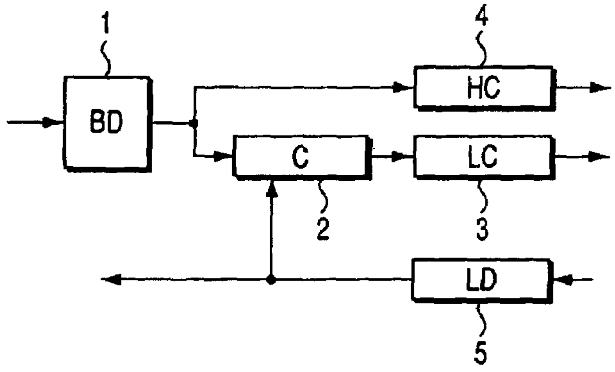

In the third pattern, as shown in FIG. 16C, a corrector 2 refers to a decoded signal output from a low-frequency decoder (LD) 5 upon correcting a low-frequency audio signal after band division.

Figure 16D:
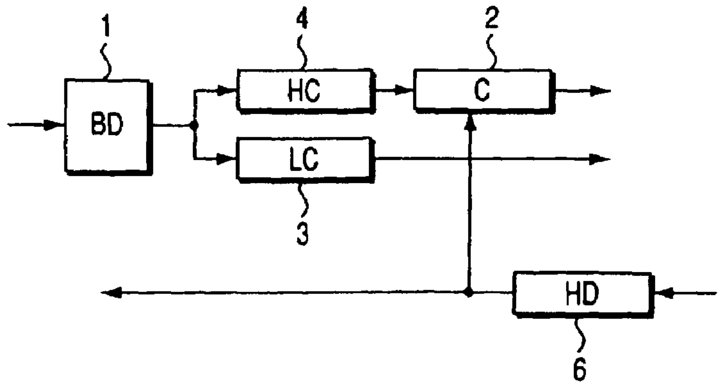

In the fourth pattern, as shown in FIG. 16D, a corrector refers to a decoded signal output from a high-frequency decoder (HD) 6 upon correcting a high-frequency audio signal after band division.

In the fourth pattern, as shown in FIG. 16D, a corrector refers to a decoded signal output from a high-frequency decoder 6 upon correcting a high-frequency audio signal after band division.

With these arrangement patterns, the correction process can be executed at a lower sampling rate than that before band division, and the data processing volume and memory size can be reduced.

Preferred embodiments of the present invention will be described hereinafter with reference to the accompanying drawings.

First Embodiment

Figure 1:
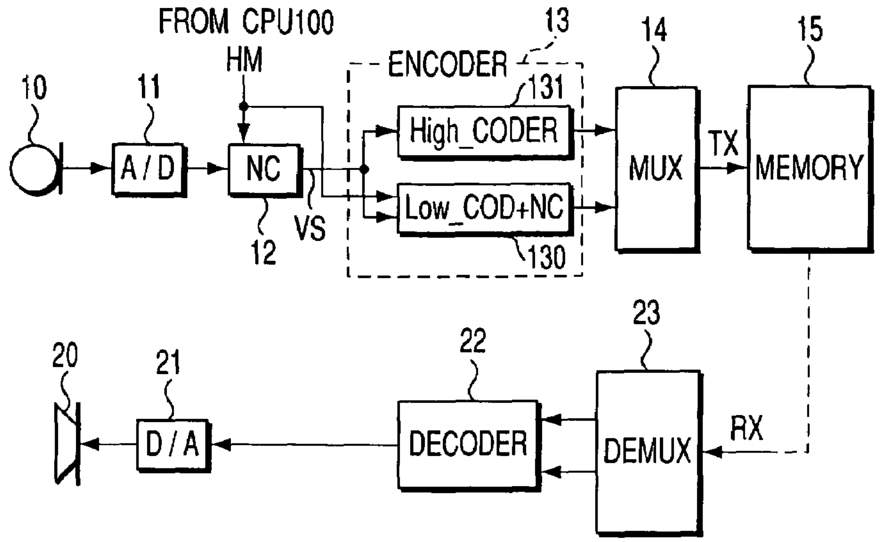
FIG. 1 is a block diagram showing the principal part of an audio codec according to the first embodiment of the present invention.

FIG. 1 is a block diagram showing the principal part of an audio codec according to the first embodiment.

As shown in FIG. 1, an apparatus of this embodiment is roughly comprised of a coding system for generating encoded audio data (TX) from a digital audio signal, and a reproduction system (decoding system) for decoding encoded audio data (RX) normally stored in a memory 15 to obtain an original audio signal.

The coding system has an A/D converter 11 for converting an audio signal input via a microphone 10 into a digital audio signal, a noise canceller 12, an encoder 13, and a multiplexer (data multiplexing unit) 14. On the other hand, the reproduction system has a loudspeaker 20, D/A converter 21, decoder (audio decoding circuit) 22, and demultiplexer 23. Note that the reproduction system shown in FIG. 1 is the same as the conventional system, and a description thereof will be omitted. In the coding system, the noise canceller 12, encoder 13, and multiplexer 14 are normally implemented by a digital signal processor (DSP).

The encoder 13 is an audio encoding circuit which executes compression coding of a digital audio signal using a predetermined algorithm (e.g., CELP), and generates encoded audio data. The encoder 13 is a wideband (e.g., AMR-WB) audio encoding circuit, and is separated into a low-frequency audio coder 130 and high-frequency audio coder (to be also referred to as an H coder hereinafter) 131. The multiplexer 14 converts encoded audio data generated by the encoder 13 to a format according to the characteristics of a transmission path, modem, error correction unit, or the like, and outputs the converted data to a memory 15.

The noise suppression function of the noise canceller 12 is controlled to be enabled/disabled in accordance with a mode signal (HM) which sets the operation mode of the encoder 13. This mode signal is output from, e.g., a CPU 100 of a portable phone, and is used to determine whether or not to enable the high-frequency audio coder (H coder) 131. Assume that the H coder 131 is enabled when "HM=1" (e.g., when the transmission rate is 23.85 kbps in AMR-WB), and the H coder 131 is disabled when "HM=0" (e.g., when the transmission rate is other than 23.85 kbps in AMR-WB), for the sake of simplicity.

The noise canceller 12 is enabled when "HM=1", and suppresses noise components of the digital audio signal output from the A/D converter 11. On the other hand, the noise canceller 12 skips a noise suppression process, and allows the digital audio signal (VS) output from the A/D converter 11 to pass through it, when "HM=0".

Figure 2:
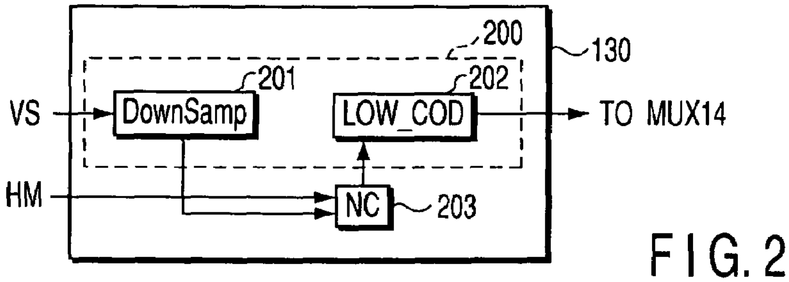
FIG. 2 is a block diagram showing the arrangement of a low-frequency audio coder according to the first embodiment.

The low-frequency audio coder 130 has a module 200 including a downsample unit 201 and low-frequency coder (L coder) 202, and a noise canceller 203, as shown in FIG. 2.

The downsample unit 201 downsamples to reduce the predetermined number of samples so as to execute a low-frequency process for the digital audio signal (VS) output from the A/D converter 11.

The noise canceller 203 executes a noise suppression process for the digital audio signal (VS) downsampled by the downsample unit 201, and outputs the processed signal to the L coder 202, when "HM=0". On the other hand, the noise canceller 203 skips a noise suppression process for the digital audio signal (VS) downsampled by the downsample unit 201, and directly passes it to the L coder 202, when "HM=1".

Operation of First Embodiment

The operation of the coding system of this embodiment will be described below with reference to FIGS. 1 and 2.

For example, the CPU of a portable phone outputs a mode signal HM to set the operation mode (HM=1/0) of the encoder 13. The A/D converter 11 converts an audio signal input via the microphone 10 into a digital audio signal.

Assume that the operation mode that enables the high-frequency audio coder (H coder) 131 (e.g., when the transmission rate is 23.85 kbps in AMR-WB) is set (HM=1). The noise canceller 12 is enabled when "HM=1", suppresses noise components of the digital audio signal output from the A/D converter 11, and outputs that signal to the encoder 13.

In the encoder 13, the H coder 131 executes a coding process for a high-frequency audio signal. On the other hand, in the low-frequency audio coder 130, when "HM=1", the noise canceller 203 skips a noise suppression process for the digital audio signal (VS) downsampled by the downsample unit 201, and directly passes it to the L coder 202. Note that the downsampled digital audio signal (VS) has already undergone the noise suppression process by the noise canceller 12 of the previous stage. The outputs (encoded audio data) from the H coder 131 and L coder 202 are multiplexed by the multiplexer 14, and the multiplexed data is stored in the memory 15.

On the other hand, assume that the operation mode that disables the high-frequency audio coder (H coder) 131 (e.g., when the transmission rate is other than 23.85 kbps in AMR-WB) is set (HM=0). When "HM=0", the noise canceller 12 skips a noise suppression process, and allows the digital audio signal (VS) output from the A/D converter 11 to pass through it. The H coder 131 is disabled.

In the low-frequency audio coder 130, when "HM=0", the noise canceller 203 executes a noise suppression process for the digital audio signal (VS) downsampled by the downsample unit 201, and outputs the processed signal to the L coder 202. The L coder 202 generates low-frequency encoded audio data, and outputs it to the multiplexer 14.

As described above, according to this embodiment, when the operation mode of the coding system disables the H coder 131 (HM=0), the noise canceller 12 inserted before the encoder 13 is also disabled. Therefore, the digital audio signal (VS) output from the A/D converter 11 passes through the noise canceller 12 and is supplied to the low-frequency audio coder 130 of the encoder 13.

In the low-frequency audio coder 130, when "HM=0", the noise canceller 203 is enabled to execute a noise suppression process for the digital audio signal (VS) downsampled by the downsample unit 201, and outputs the processed signal to the L coder 202. In this manner, the low-frequency audio coder 130 generates low-frequency encoded audio data from the low-frequency digital audio signal from which noise components has been suppressed.

Therefore, in the operation mode that disables the high-frequency audio coder 131, the noise canceller 12 inserted before the encoder 13 is disabled. Hence, the data processing volume and memory size in the DSP required to implement the noise canceller function can be reduced. On the other hand, in the low-frequency audio coder 130, since the low-frequency noise canceller 203 is enabled, low-frequency encoded audio data can be generated without sound quality deterioration. In this case, the low-frequency noise canceller 203 executes a noise suppression process for the downsampled digital audio signal (the number of samples of which has been reduced). Hence, the data processing volume and memory size in the DSP required to implement the function of the noise canceller 203 can be more reduced than those upon enabling the high-frequency noise canceller 12.

Second Embodiment

Figure 3:
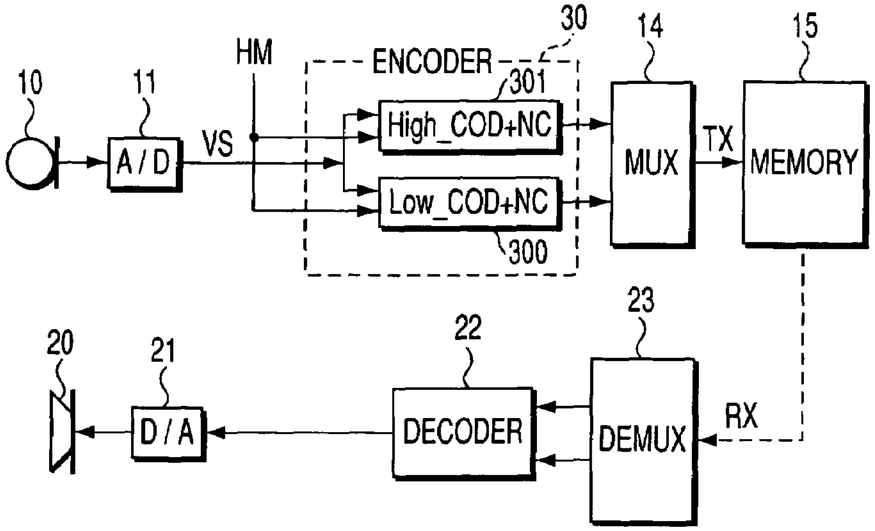
FIG. 3 is a block diagram showing the principal part of an audio codec according to the second embodiment of the present invention.

FIG. 3 is a block diagram showing the principal part of an audio codec according to the second embodiment.

A coding system of this embodiment does not have any independent high-frequency noise canceller, and comprises an encoder 30 which has a low-frequency audio coder 300 including a low-frequency noise canceller (LNC) and a high-frequency audio coder 301 including a high-frequency noise canceller (HNC). Note that the reproduction system (decoding system) is the same as that in the first embodiment (see FIG. 1), and a description thereof will be omitted.

Figure 4:
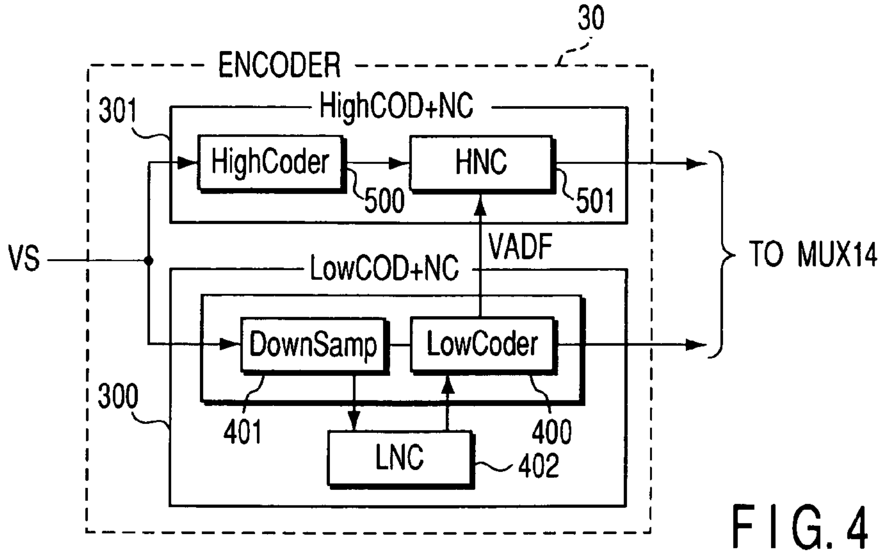
FIG. 4 is a block diagram showing the arrangement of an encoder according to the second embodiment.

In the encoder 30, the low-frequency audio coder 300 has a low-frequency coder (L coder) 400, downsample unit 401, and low-frequency noise canceller (LNC) 402, as shown in FIG. 4. The downsample unit 401 downsamples to reduce the predetermined number of samples so as to execute a low-frequency process for a digital audio signal (VS) output from the A/D converter 11. The LNC 402 executes a noise suppression process for mainly suppressing low-frequency ambient noise from the downsampled digital audio signal (VS). The L coder 400 generates low-frequency encoded audio data from the digital audio signal (downsampled signal) that has undergone noise suppression by the LNC 402, and outputs it to the multiplexer 14.

On the other hand, the high-frequency audio coder 301 has a high-frequency coder (H coder) 500 and high-frequency noise canceller (HNC) 501. Whether or not the H coder 500 is enabled is determined in accordance with an operation mode (HM=1/0) set by the aforementioned mode signal HM. That is, when "HM=1", the H coder 500 is enabled (e.g., when the transmission rate is 23.85 kbps in AMR-WB), and executes a coding process for a high-frequency audio signal of the digital audio signal (VS) output from the A/D converter 11.

The HNC 501 executes a noise suppression process for suppressing high-frequency ambient noise. The outputs (encoded audio data) from the HNC 501 and L coder 400 are multiplexed by the multiplexer 14, and the multiplexed data is stored in the memory 15.

When "HM=0", the H coder 500 is disabled (e.g., when the transmission rate is other than 23.85 kbps in AMR-WB). In this operation mode, the low-frequency audio coder 300 alone is enabled to output encoded audio data as the output from the L coder 400 to the multiplexer 14.

As described above, according to this embodiment, when the operation mode of the coding system disables the H coder 500 (HM=0), the high-frequency audio coder 301 is disabled, and the low-frequency audio coder 300 alone is enabled. Hence, when "HM=0", only the LNC 402 included in the low-frequency audio coder 300 is enabled to execute a noise suppression process for the digital audio signal (VS) downsampled by the downsample unit 401. Therefore, in the operation mode that disables the high-frequency audio coder 301, the data processing volume and memory size in the DSP required to implement the function of the noise canceller can be reduced.

(VAD Function)

The low-frequency audio coder 300 has a VAD (Voice Activity Detection) function of detecting, based on the digital audio signal (VS), whether the input speech period is a voiced or silence period. Upon detection of a silence period, the coder 300 outputs a predetermined flag (VADF) to the high-frequency audio coder 301.

In the high-frequency audio coder 301, the output from the H coder 500 is encoded audio data mainly associated with the high-frequency gain of an audio signal. The HNC 501 is a high-frequency noise canceller which simply cancels noise by processing that encoded audio data.

Upon detection of a silence period (VADF=0), the HNC 501 determines that the high-frequency gain is that of a noise signal (noise), subtracts a value corresponding to the gain from the output signal from the H coder 500, and outputs the difference to the multiplexer 14. On the other hand, upon detection of a voiced period (VADF=1), the HNC 501 subtracts the value, which is subtracted in the silence period (VADF=0) from the input of the H coder 500, and outputs the difference to the multiplexer 14.

Figure 5A:
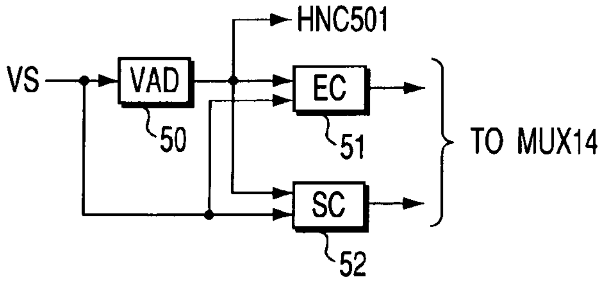
FIGS. 5A and 5B are block diagrams for explaining a VAD function according to the second embodiment.

In the low-frequency audio coder 300, the L coder 400 includes the VAD function. More specifically, the L coder 400 has a VAD unit 50, voiced coder unit 51, and silence coder unit 52, as shown in FIG. 5A. The silence coder unit 52 is enabled when the VAD unit 50 outputs a flag (VADF=0) indicating a silence period. The voiced coder unit 51 is enabled when the VAD unit 50 outputs a flag (VADF=1) indicating a voiced period. The VAD unit 50 outputs the flag (VADF=1/0) to the HNC 501 of the high-frequency audio coder 301.

Figure 5B:
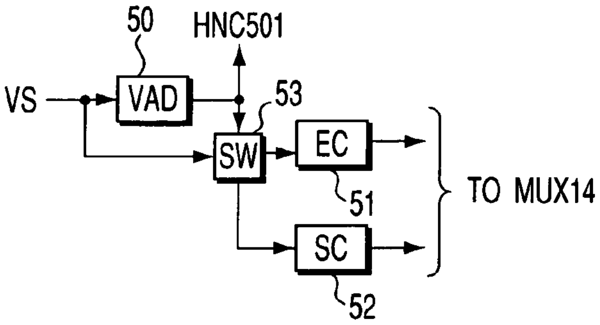

The L coder 400 may have a VAD unit 50, voiced coder unit 51, silence coder unit 52, and switch unit 53, as shown in FIG. 5B. The switch unit 53 transfers the digital audio signal (VS) to the silence coder unit 52 when the VAD unit 50 outputs a flag (VADF=0) indicating a silence period. The switch unit 53 transfers the digital audio signal (VS) to the voiced coder unit 51 when the VAD unit 50 outputs a flag (VADF=1) indicating a voiced period. The VAD unit 50 outputs the flag (VADF=1/0) to the HNC 501 of the high-frequency audio coder 301.

(Modification)

Figure 6:
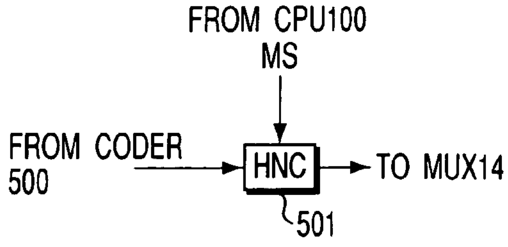
FIG. 6 is a block diagram showing a modification of the second embodiment.

FIG. 6 is a block diagram showing a modification of the second embodiment.

In an arrangement of this modification, the operation of the HNC 501 in the high-frequency audio coder 301 is controlled in accordance with an operation mode signal (MS) from, e.g., a CPU 100 of a portable phone. More specifically, the operation mode signal (MS) corresponds to a signal for setting a mode that processes an audio signal for, e.g., music.

In the high-frequency audio coder 301, upon executing a high-frequency coding process for an audio signal for music coming from the CPU 100, the HNC 501 operates in accordance with the operation mode signal (MS=1), and executes a high-frequency noise suppression process effective for music.

Note that the operation mode signal (MS) set by the CPU 100 is not limited to such specific mode for music, but may be used to set various other modes.

Third Embodiment

Figure 7:
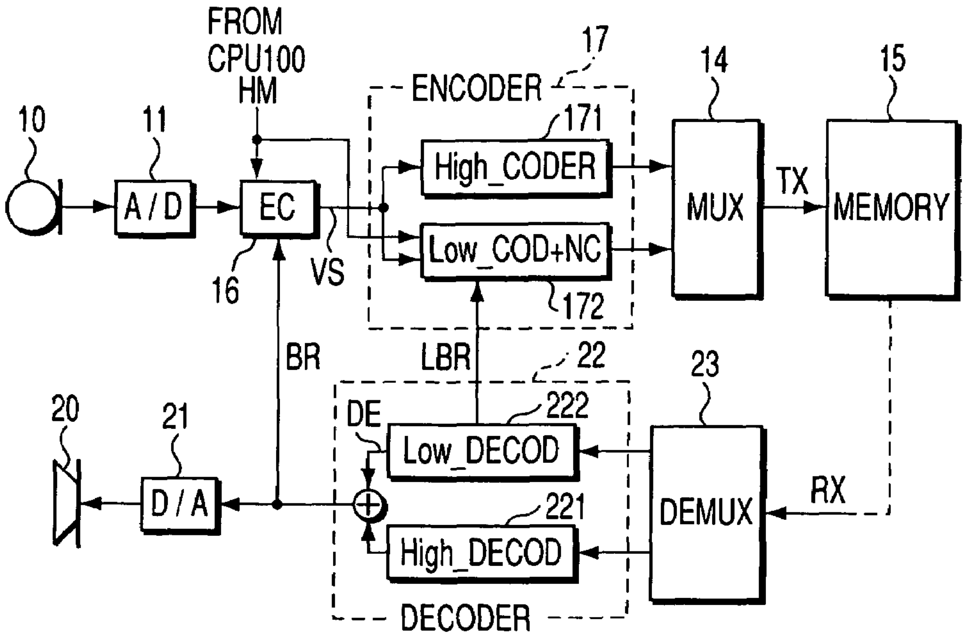
FIG. 7 is a block diagram showing the principal part of an audio codec according to the third embodiment of the present invention.
Figure 8A:
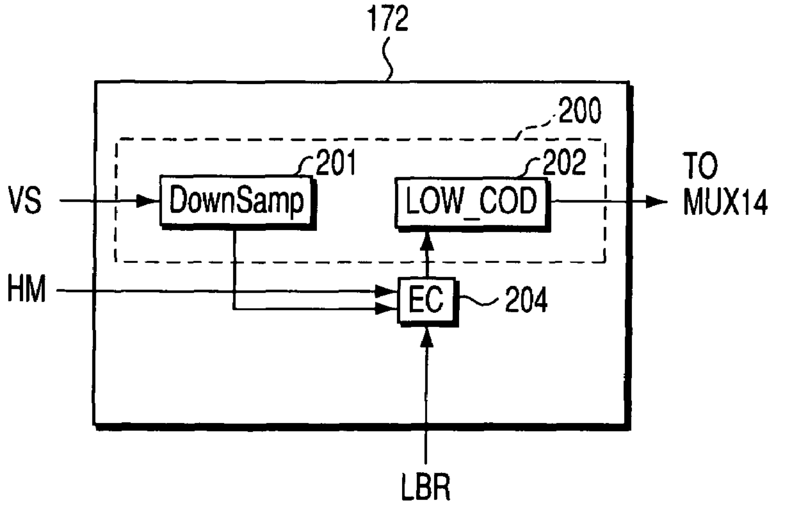
FIGS. 8A and 8B are block diagrams showing the arrangement of a low-frequency audio coder according to the third embodiment.
Figure 8B:
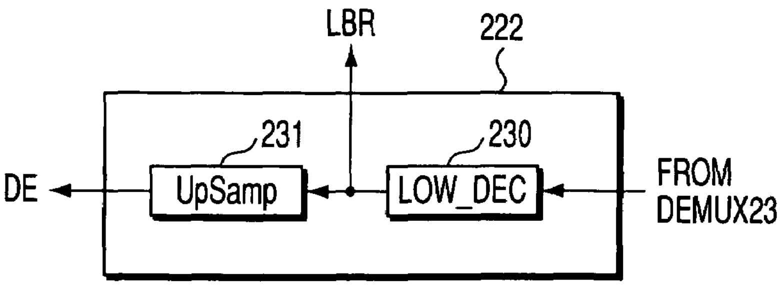

FIG. 7 is a block diagram showing the principal part of an audio codec according to the third embodiment. FIGS. 8A and 8B are block diagrams showing the arrangement of a low-frequency audio coder 172 and low-frequency audio decoder 222 in FIG. 7.

In this embodiment, as can be seen from comparison between FIGS. 1 and 7 and that between FIGS. 2 and 8A, the noise canceller in the first embodiment is replaced by an echo canceller, a received audio signal (BR signal) input from the encoder 22 to a wideband echo canceller 16 is added, and an LBR signal input from the low-frequency audio decoder 222 to the low-frequency audio coder 172 (echo canceller 204) is added.

Either one of the echo cancellers 16 and 204 is enabled: when a high-frequency audio coder 171 is enabled (e.g., when the transmission rate is 23.85 kbps in AMR-WB), the echo canceller 16 alone is enabled; when the coder 171 is disabled (e.g., when the transmission rate is other than 23.85 kbps in AMR-WB), the echo canceller 204 alone is enabled. Therefore, when the high-frequency audio coder 171 is disabled, the data processing volume and memory size in the DSP required to implement the function of the echo canceller can be reduced.

Fourth Embodiment

Figure 9:
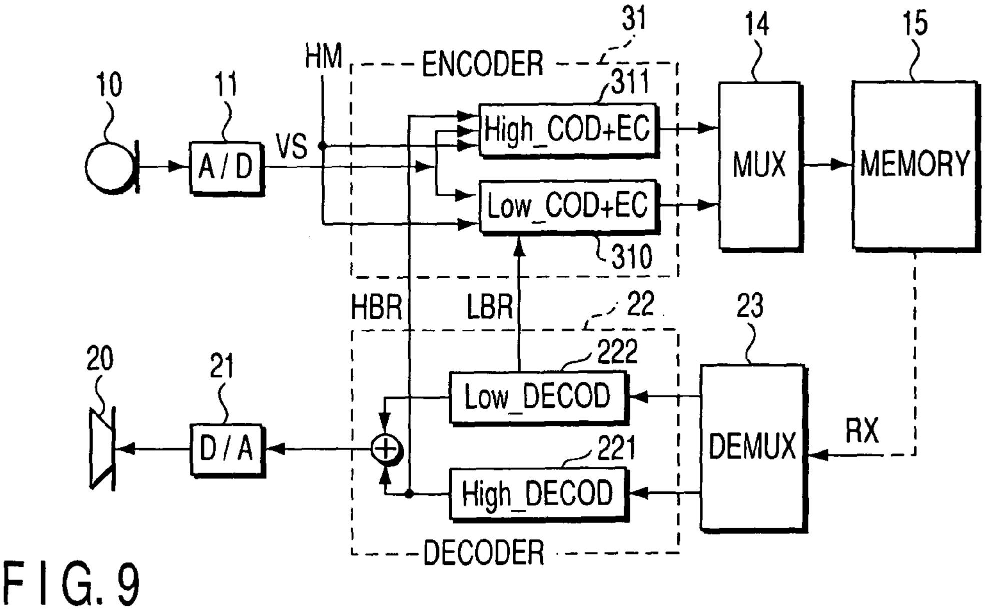
FIG. 9 is a block diagram showing the principal part of an audio codec according to the fourth embodiment of the present invention.
Figure 10:
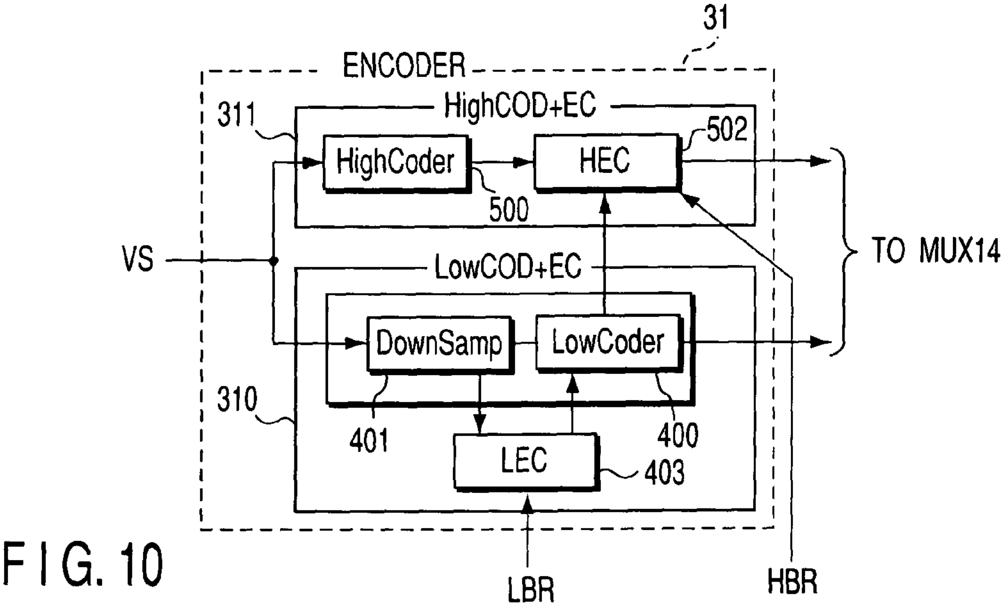
FIG. 10 is a block diagram showing the arrangement of an encoder according to the fourth embodiment.

FIG. 9 is a block diagram showing the principal part of an audio codec according to the fourth embodiment. FIG. 10 is a block diagram showing the arrangement of an encoder 31 in FIG. 9.

In this embodiment, as can be seen from comparison between FIGS. 3 and 9 and that between FIGS. 4 and 10, the noise canceller in the second embodiment is replaced by an echo canceller, an LBR signal input from a low-frequency audio decoder 222 to a low-frequency audio coder 310 (low-frequency echo canceller 403) is added, and an HBR signal input from a high-frequency audio decoder 221 to a high-frequency audio coder 311 (high-frequency echo canceller 502) is added.

When the high-frequency audio coder 500 is disabled (e.g., when the transmission rate is other than 23.85 kbps in AMR-WB), a high-frequency echo canceller 502 is disabled, and the low-frequency echo canceller 403 alone is enabled. Hence, when the high-frequency audio coder 500 is disabled, the data processing volume and memory size in the DSP required to implement the function of the echo canceller can be reduced.

(Modification)

Figure 11:
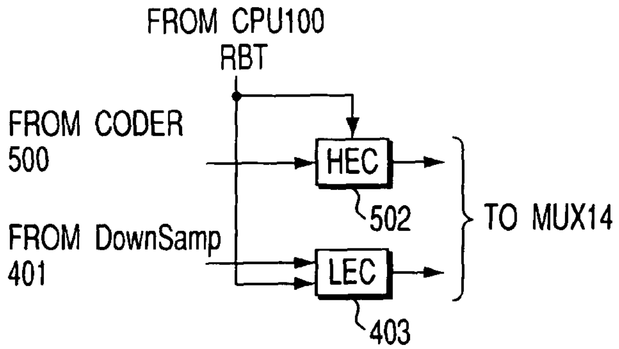
FIG. 11 is a block diagram showing a modification of the fourth embodiment.

FIG. 11 is a block diagram showing a modification of the fourth embodiment.

In an arrangement of this modification, the operation of the HEC 502 in the high-frequency audio coder 311 is controlled in accordance with an operation mode signal (RBT) from, e.g., a CPU 100 of a portable phone. More specifically, the operation mode signal (RBT) sets a mode for processing a signal which has an extreme frequency deviation like a push tone, calling melody, alarm tone, or the like of a phone.

The HEC 502 operates in accordance with the operation mode signal (RBT=1). The HEC 502 and the LEC 403 stop learning operation.

Note that the operation mode signal (RBT) set from the CPU 100 is not limited to such specific mode for processing a push tone, calling melody, alarm tone, or the like, but may be used to set various other modes such as a coding mode or the like.

Figure 12:
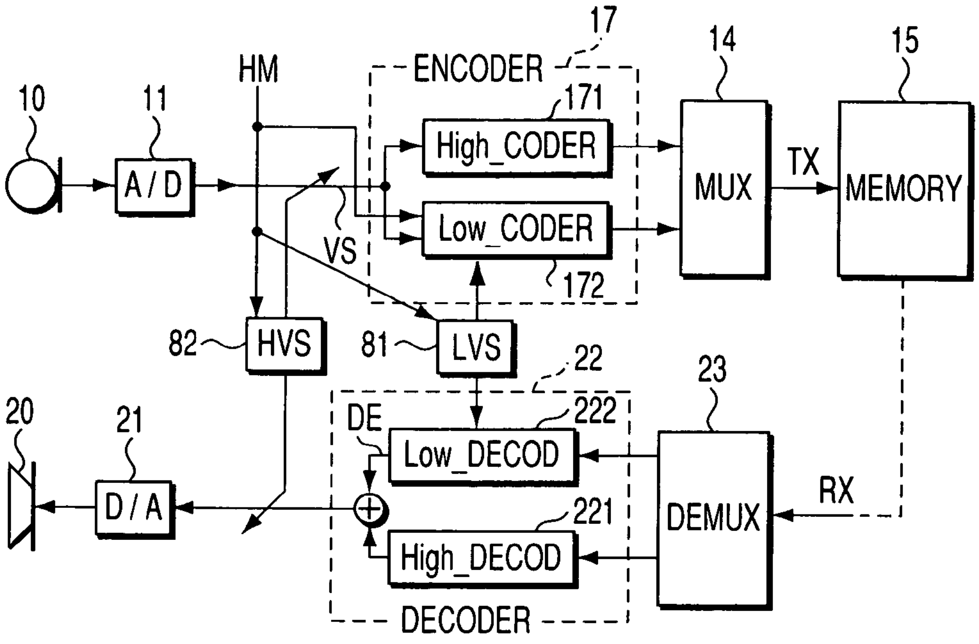
FIG. 12 is a block diagram showing the principal part of an audio codec according to the fifth embodiment of the present invention.
Figure 13A:
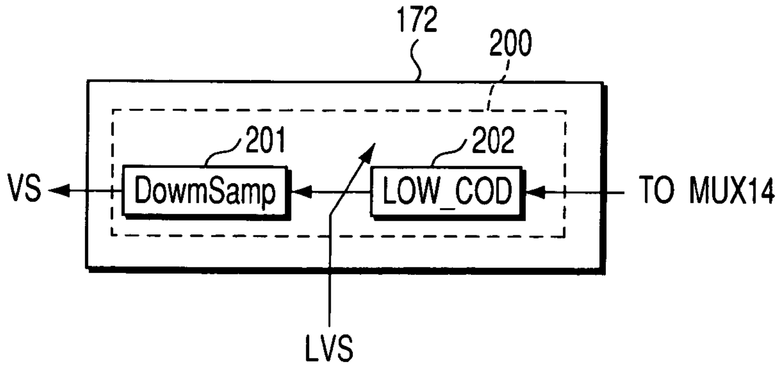
FIGS. 13A and 13B are block diagrams showing the arrangement of a low-frequency audio coder according to the fifth embodiment.
Figure 13B:
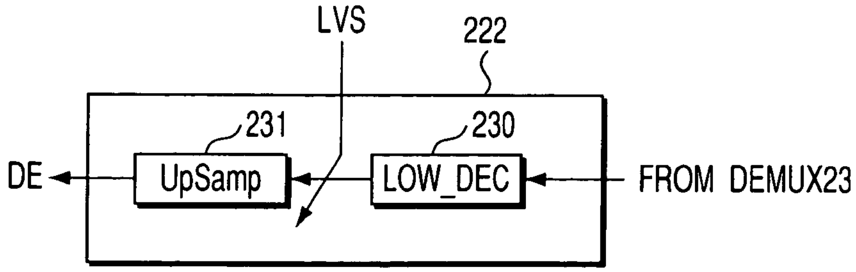

Also, by replacing the echo cancellers in FIGS. 7 to 10 by voice switches, embodiments shown in FIGS. 12 to 15B are available. In FIGS. 12, 13A, and 13B, a low-frequency voice switch (LVS) 81 and high-frequency voice switch (HVS) 82 are combined.

Figure 14:
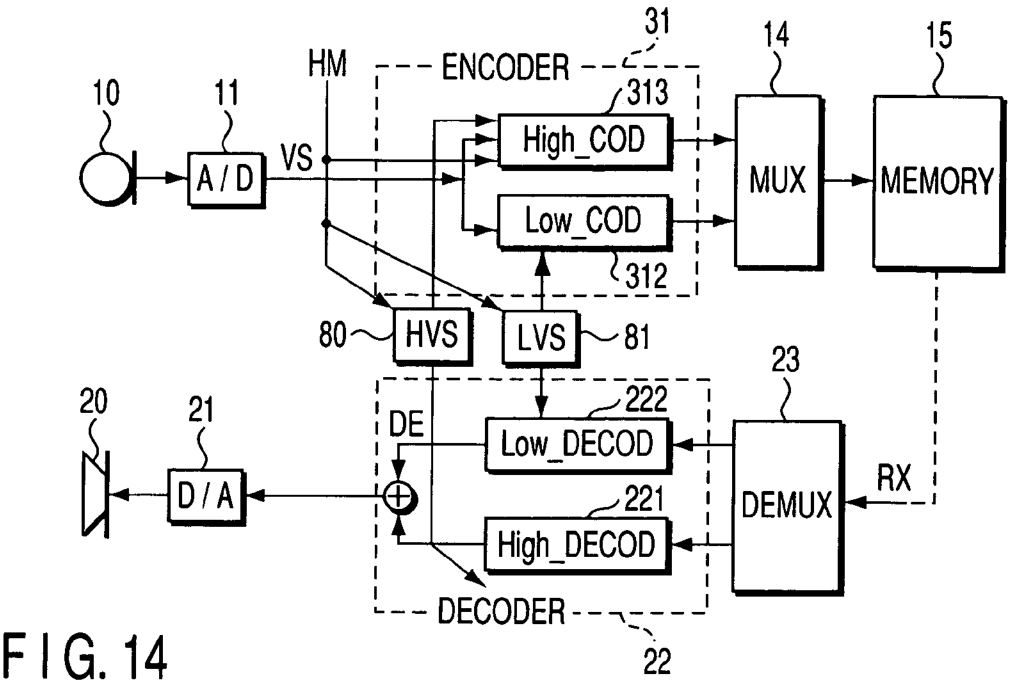
FIG. 14 is a block diagram showing the principal part of an audio codec according to the sixth embodiment of the present invention.
Figure 15A:
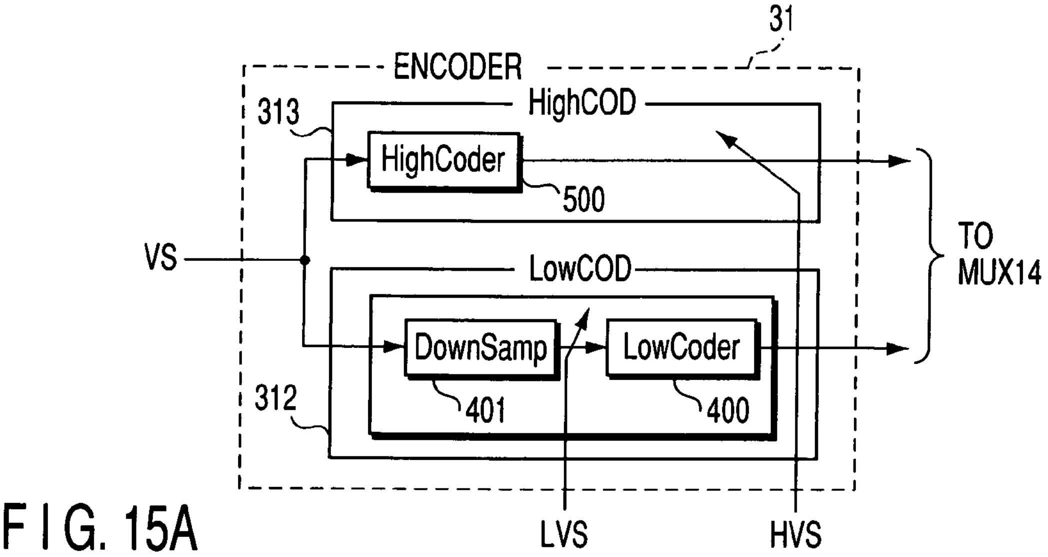
FIGS. 15A and 15B are block diagrams showing the arrangement of an encoder according to the sixth embodiment.
Figure 15B:
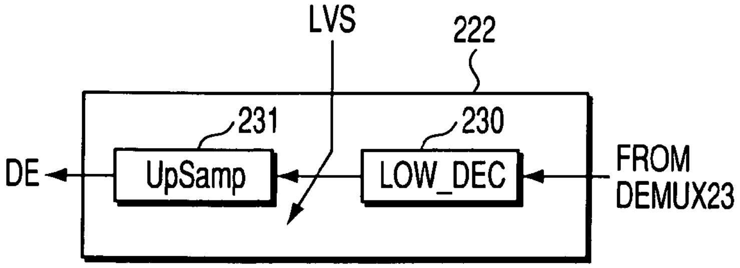

In FIGS. 14, 15A, and 15B, a high-frequency voice switch and low-frequency voice switch are combined. In either embodiment, when a high-frequency audio coder is disabled (e.g., when the transmission rate is other than 23.85 kbps in AMR-WB), only the low-frequency voice switch is enabled to reduce the data processing volume and memory size.

Other Embodiments

In FIG. 4, the high-frequency audio coder 500 is inserted before the high-frequency noise canceller 501. Alternatively, the high-frequency noise canceller 501 may be inserted before the high-frequency audio coder 500. In this case, when the high-frequency audio coder 500 is enabled, high-frequency audio coding is done after a noise cancellation process of a high-frequency signal. The same modification of the arrangement applies to FIGS. 10 and 15A.

That is, the high-frequency echo canceller 502 or a high-frequency attenuator may be inserted before the high-frequency audio coder 500. In this case, when the high-frequency audio coder 500 is enabled, high-frequency audio coding is done after a high-frequency echo cancellation process or a high-frequency voice switch process.

In FIG. 9, the output signal from the high-frequency audio decoder 221 is used as a reference signal for the high-frequency echo canceller. Alternatively, an input signal of the high-frequency audio decoder 221 may be used as a reference signal. In this case, the high-frequency echo canceller uses a high-frequency signal power in an input bitstream of the high-frequency audio decoder 221 as a reference signal.

In FIG. 14, an attenuator of the high-frequency voice switch 80 is inserted after the high-frequency audio decoder 221. Alternatively, the attenuator may be inserted before the high-frequency audio decoder 221. In this case, the high-frequency voice switch 80 executes a loss control process for a high-frequency signal power in an input bitstream of the high-frequency audio decoder 221.

In FIGS. 12 to 15, a loss controller of each voice switch comprises an attenuator, but may comprise an ON/OFF switch instead.

As described above, according to the above embodiments, especially in an audio codec which has a wideband audio coding circuit (encoder) and one or more of a noise canceller, echo canceller, and voice switch, the data processing volume and memory size required to implement the function of the noise canceller, echo canceller, or voice switch especially in the coding system can be reduced without deteriorating the sound quality.

Therefore, the audio coding processing efficiency can be consequently improved. More specifically, when an audio coding process for high-frequency audio signal components is skipped, and audio coding for low-frequency signal components is executed, a suppression process of noise or echo components contained in the low-frequency audio signal components can be executed. Therefore, in the arrangement that executes a noise or echo suppression process using the DSP, the data processing volume and memory size required to implement the function of the noise canceller, echo canceller, or voice switch can be reduced in the mode that skips the high-frequency audio coding process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for audio coding, comprising:

a high-frequency audio coder which encodes high-frequency components of a digital audio signal;

a downsampling unit which lowers a sampling frequency of the same digital audio signal as the high-frequency audio coder processes;

a first noise suppressor which suppresses noise components contained in the signal from the downsampling unit;

a low-frequency audio coder which encodes the signal processed by the first noise suppressor, and a second noise suppressor which suppresses high-frequency noise components of the digital audio signal before the digital audio signal is processed by the high-frequency audio coder and the downsampling unit, wherein when the high-frequency audio coder is disabled, the second noise suppressor skips suppression of the high-frequency noise components and allows the digital audio signal to pass through the second noise suppressor.

2. An apparatus for audio coding, comprising:

a high-frequency audio coder which encodes high-frequency components of a digital audio signal;

a downsampling unit which lowers a sampling frequency of the same digital audio signal as the high-frequency audio coder processes;

a noise suppressor which suppresses noise components contained in the signal from the downsampling unit; and a low-frequency audio coder which encodes the signal processed by the noise suppressor, wherein when the high-frequency audio coder is enabled, the noise suppressor skips suppression of the low-frequency noise components, and inputs the digital audio signal to the low-frequency audio coder.

3. An apparatus for audio coding, comprising:

a first echo suppressor which suppresses high-frequency echo components of a digital audio signal;

a high-frequency audio coder which encodes the signal processed by the first echo suppressor;

a downsampling unit which lowers a sampling frequency of the same digital audio signal as the first echo suppressor processes;

a second echo suppressor which suppresses echo components contained in the signal processed by the downsampling unit; and a low-frequency audio coder which encodes the signal processed by the second echo suppressor, wherein when the high-frequency audio coder is disabled, the first echo suppressor skips suppression of the echo components and allows the digital audio signal to pass through the first echo suppressor.

4. An apparatus for audio coding, comprising:

a first echo suppressor which suppresses high-frequency echo components of a digital audio signal;

a high-frequency audio coder which encodes the signal processed by the first echo suppressor;

a downsampling unit which lowers a sampling frequency of the same digital audio signal as the first echo suppressor processes;

a second echo suppressor which suppresses echo components contained in the signal processed by the downsampling unit; and a low-frequency audio coder which encodes the signal processed by the second echo suppressor, wherein when the high-frequency audio coder is enabled, the second echo suppressor skips suppression of the echo components, and inputs the digital audio signal to the low-frequency audio coder.

5. An apparatus for coding a digital audio signal, comprising:

a band division unit which divides the digital audio signal into high-frequency components and low-frequency components;

a first audio coder which encodes the high-frequency components of the digital audio signal in accordance with a mode signal which instructs encoding the high-frequency components of the digital audio signal;

a second audio coder which encodes the low-frequency components of the digital audio signal;

a first suppressor which suppresses noise components contained in the digital audio signal before encoding operation of the first and second audio coders;

a second suppressor which suppresses noise components contained in the low-frequency components of the digital audio signal before encoding operation of the second audio coder; and a controller which causes the second audio coder to encode the low-frequency components of the digital audio signal and disables the first suppressor, when the mode signal is disabled.

6. A method of coding a digital audio signal, comprising:

dividing the digital audio signal into high-frequency components and low-frequency components;

encoding the high-frequency components of the digital audio signal in accordance with a mode signal which instructs encoding the high-frequency components of the digital audio signal;

encoding the low-frequency components of the digital audio signal;

first suppressing noise components contained in the digital audio signal before the high-frequency components and the low-frequency components of the digital audio signal are encoded;

second suppressing noise components contained in the low-frequency components of the digital audio signal before the low-frequency components of the digital audio signal are encoded; and when the mode signal is disabled, encoding the low-frequency components of the digital audio signal and disabling the first suppressing noise components contained in the digital audio signal.

7. An apparatus for coding a digital audio signal, comprising:

a suppressor which suppresses noise components of high-frequency components and low-frequency components contained in the digital audio signal in case that a mode signal instructs encoding both of the high-frequency components and the low-frequency components, and suppresses noise components of low-frequency components contained in the digital audio signal in case that the mode signal instructs encoding the low-frequency components; and a coder which encodes both of the high-frequency components and the low-frequency components contained in the digital audio signal after the noise components are suppressed by the suppressor in case that the mode signal instructs encoding both of the high-frequency components and the low-frequency components, and encodes the low-frequency components contained in the digital audio signal after the noise components are suppressed by the suppressor in case that the mode signal instructs encoding the low-frequency components.

8. A method of coding a digital audio signal, comprising:

suppressing noise components of high-frequency components and low-frequency components contained in the digital audio signal when the high-frequency components and the low-frequency components are encoded in accordance with a mode signal which instructs encoding both of the high-frequency components and the low-frequency components or encoding only the low-frequency components;

suppressing noise components contained only in the low-frequency components of the digital audio signal, when the mode signal instructs encoding only the low-frequency components in accordance with the mode signal;

encoding both of the high-frequency components and the low-frequency components whose noise components are suppressed when the mode signal instructs encoding both of the high-frequency components and the low-frequency components; and encoding only the low-frequency components whose noise components are suppressed when the mode signal instructs encoding only the low-frequency components.

* * * * *